United States Patent [19]
Delatorre

[11] Patent Number: 5,320,169
[45] Date of Patent: Jun. 14, 1994

[54] GAUGE CARRIER

[75] Inventor: Leroy C. Delatorre, Sugar Land, Tex.

[73] Assignee: Panex Corporation, Sugar Land, Tex.

[21] Appl. No.: 990,004

[22] Filed: Dec. 14, 1992

[51] Int. Cl.⁵ .................. E21B 17/07; F16F 7/00; G01D 11/10

[52] U.S. Cl. .................... 166/113; 73/430; 166/242

[58] Field of Search ............. 166/113, 242, 243, 64; 175/40, 48; 73/430, 431; 267/141, 136, 140.4

[56] References Cited

U.S. PATENT DOCUMENTS

| | | | |
|---|---|---|---|
| 4,265,305 | 5/1981 | Stone et al. | 166/113 |
| 4,628,995 | 12/1986 | Young et al. | 166/113 |
| 4,711,123 | 12/1987 | Christensen | 166/113 X |
| 4,928,764 | 5/1990 | Roessler | 166/113 X |
| 4,932,471 | 6/1990 | Tucker et al. | 166/113 X |

Primary Examiner—Stephen J. Novosad
Attorney, Agent, or Firm—Donald H. Fidler

[57] ABSTRACT

A gauge carrier for absorbing longitudinal and radial shock forces on a shock sensitive gauge in a gauge housing where the gauge is insertable and retrievable with a unit assembly. The gauge or gauges are coupled to a longitudinal shock absorber comprised of belleville springs by a ball and socket arrangement to isolate longitudinal shock waves from the gauge while annular resilient members provide radial shock absorption for the gauge in the housing. The longitudinal shock absorber can be selectively pre-loaded.

17 Claims, 4 Drawing Sheets

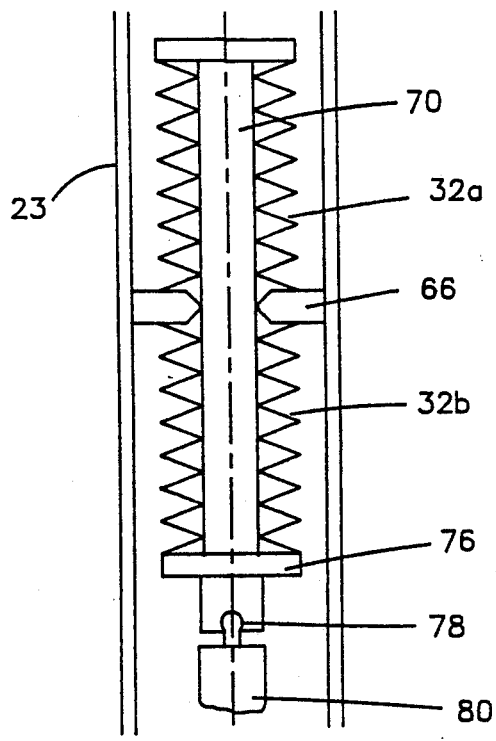
FIG. 8
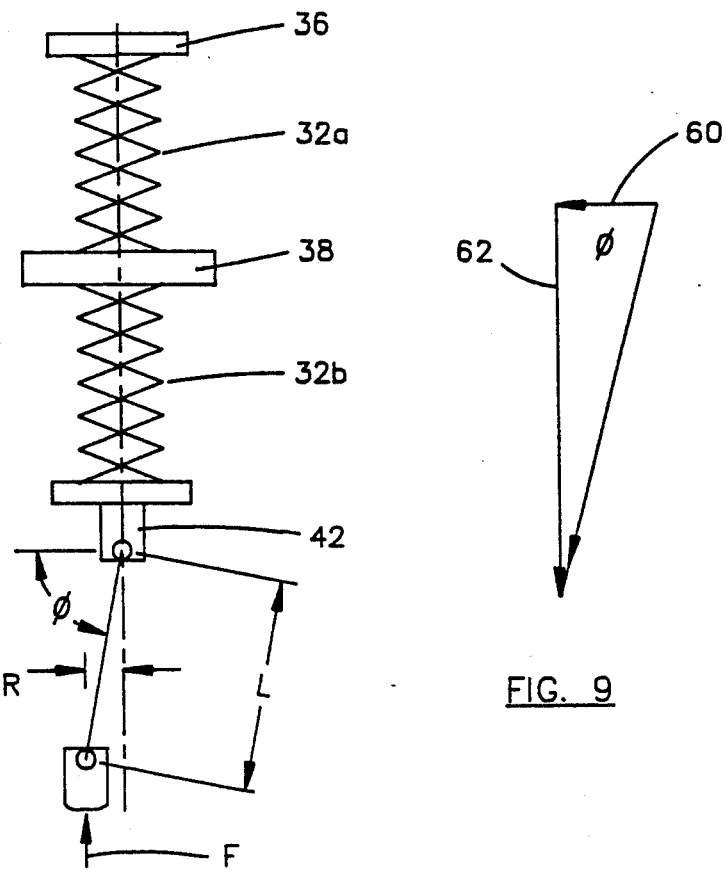
FIG. 9
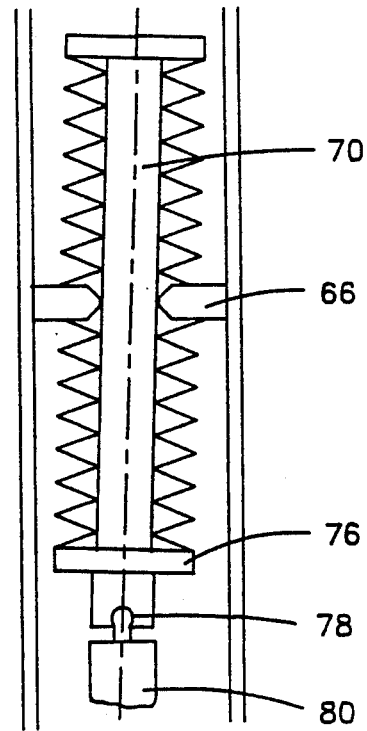
FIG. 11
FIG. 12

GAUGE CARRIER

FIELD OF INVENTION

This invention relates to a downhole pressure gauge carrier for supporting and carrying pressure and temperature measuring gauges in a well bore, and more particularly, to a gauge or tool carrier which provides a shock mounting support for a sensitive pressure gauges to inhibit damage from occurring under high shock loads in longitudinal and lateral directions.

BACKGROUND OF INVENTION

Downhole pressure and temperature measuring gauges are utilized in well bore operations to measure temperature and pressure conditions in the well bore. As disclosed and discussed in U.S. Pat. No. 4,628,995, a gauge carrier can be attached to a packer and a perforating device is lowered through the tubing to a location below the packer to perforate the well bore below the set packer. Alternatively, the perforating device can be attached to a pipe below the packer and run in the well bore while attached to the packer. In the '995 patent, the gauge carrier accommodates three gauges located around the circumference of the gauge carrier and each gauge carrier is shock mounted against longitudinal vibration by belleville springs. This system has been highly successful in isolating the shock sensitive pressure gauges from the longitudinal shock forces produced in the well bore during running in the well bore and from detonation of perforating guns when in the well bore.

One of the reasons that pressure gauges are sensitive to shock forces is that typically a quartz transducer is utilized for high accuracy measurement and these transducers are particularly sensitive to shock impact forces. Obviously, the well operator who has gone to the trouble of performing well operations to perforate and to obtain contemporaneous pressure measurements expects the pressure gauge to function. If the gauge malfunctions because the shock forces of the perforator damage the pressure gauge, be it quartz or otherwise, the entire operation is of no value.

The gauge carrier in '995 patent cannot be utilized in deep, small diameter well bores because it's O.D. is too large and it is not intended to be proximate to the perforator means. The smallest O.D. of a pressure gauge is right at $1\frac{1}{4}''$ and thus to reduce the diameter, the gauges (if more than one is used) are stacked in line (end-to-end) and disposed within the central bore of a tubular carrier. Also, in deep, small diameter well bores, the perforating system utilized in conducting a drill stem test has to be lowered on drill pipe and the o.d. of the perforator has a relatively small clearance with respect to the i.d. of the well bore. Perforators used in such tests can utilize as much as a 100 feet of a shot density of four to six shots per foot below a testing packer can thus generate terrifically high shock loads in both longitudinal and lateral directions. Because of the shock loads encountered, the tubular gauge carrier has been spaced a long distance from the perforator to reduce the shock impact effects.

In an effort to get the pressure gauge nearer to the perforator (and thus to obtain more representative pressure measurements) it has been proposed to use pressure gauges coupled end-to-end to one another where the upper pressure gauge is connected to a longitudinal rod member which slidably passes through a spring support plate located in an upper sub member. The spring plate is fixed in position in the sub member. Helical springs are located on the shaft above and below the spring plate. The spring members are compressed to provide a counter balancing spring force so that the attached rod member and pressure gauges can vibrate or move up and down relative to the tool gauge carrier to reduce or dampen the longitudinal shock effects. At spaced intervals along the length of the pressure gauges are radially extending rubber finger centralizers which are short rubber finger elements extending outwardly from the pressure gauge housing to contact the inner wall of the gauge housing. The fingers are four in number and are located at 90° relative to one another and are intended to isolate the gauges from contacting the wall of the gauge carrier in response to lateral shock waves. In this system, the rubber fingers do not provide reliable shock isolation in the lateral direction and the gauges are directly coupled to the rod member so that longitudinal shock effects can cause lateral movement of the gauges in the gauge carrier.

In still another device intended for high shock absorption, the gauges are centralized in a tubular carrier gauge housing by annular rubber or elastomer devices disposed at spaced intervals along the length of the gauges. The annular rubber devices provide for lateral shock absorption universally around the periphery of the gauges. The ends of the gauge carriers are respectively engaged by helical coil springs which are compressed during assembly to exert a centralizing spring force on the gauges within the gauge housing. The springs under compression provide for dampening the shock movement in a longitudinal direction. While this device provides independent lateral and longitudinal isolation of the shock forces from the gauge housing with respect to a gauge carrier, the device is complex and difficult to assemble in the field.

Since the deflection travel of the springs are limited, the assembly has to be matched to the gauge length to obtain the desired force. However, since the assembly is made by inside a housing, it is not possible to check the spring compression. Also where there are sequential tests, it is necessary to completely break down and reassemble the device for each test. Furthermore, if the gauges vary in length, substantial inventory of spare parts is required.

SUMMARY OF THE INVENTION

The present invention concerns a gauge carrier shock mounting system which can be located near to a long string of perforating devices and withstand the lateral and longitudinal shock forces generated upon detonation upon the perforating devices. The mounting system includes annular resilient elastomer spacer members disposed at spaced intervals along the length between the gauges and the gauge carrier. The annular resilient spacer members dampen lateral shock forces generated upon detonation of a perforating apparatus.

A longitudinal shock absorbing means is constructed with belleville springs or disc springs located on a rod member where the belleville springs are located to either side of a support disc and the rod member is slidable in a central bore of the support disc. The support disc is receivable in a sub housing and the rod member is utilized to compress the disc springs. The disc springs provide a spring loaded counter balancing with respect to the support disc in a longitudinal direction. The belleville springs to either side of the support disc are compressed and arranged to provide a selected damping force in a longitudinal direction in response to longitudinal shock. The belleville springs are selected and arranged to provide the desired spring force and are easily assembled in the field to the selected damping force by a simple wrench mechanism and assembling the rod member to a coupling member.

If the gauges are rigidly coupled to the rod member, the gauges are not allowed to freely or significantly shift laterally at the junction with the rod member. Thus, external lateral (radial) forces are transmitted to the gauges in this situation. The external lateral force effect is isolated by the present invention by using a double ball connector means between the gauges and the rod member. The connector means includes a central block member which is connected by upper and lower ball members in ball sockets respectively to a coupling member on the gauges and to the rod member by coupling member. The block member and ball connections effectively isolate the longitudinal shock absorbing means from the gauges.

It can be appreciated that a vertical reaction force tending to move the gauges toward the belleville spring assembly can result in a lateral shift of the ball joint block member and a resultant lateral force effect which tends to jam the gauges against the sidewall of the carrier. The magnitude of the lateral force effect is dependent upon the angle of the reaction force with respect to the lateral reaction force which, in turn is dependent upon the lateral deflection distance and the length between the ball pivots. Because the maximum lateral deflection distance is small (because of the carrier I.D.) the length between the ball pivots can be relatively long so that the lateral force effect can be minimized.

In another form of the invention, a pivot is built into the longitudinal shock absorbing means and shortens the length of the assembly, which is desirable. In this form of the invention, the opening in the support disc is shaped so that the rod member can freely tilt with respect to the support disc without bending while moving longitudinal. This system uses only a ball and socket member with the support disc and the rod member providing the other pivot for the assembly.

BRIEF DESCRIPTION OF THE DRAWINGS

FIG. 8 is a schematic representation of the arrangement when subjected to a shock load;

FIG. 9 is a vector relationship of shock loads;

FIG. 11 is a schematic representation of the arrangement in FIG. 10; and

FIG. 12 is a schematic representation of the arrangement in FIG. 10 when subjected to a shock load.

DESCRIPTION OF THE INVENTION

Figures 1, 2:
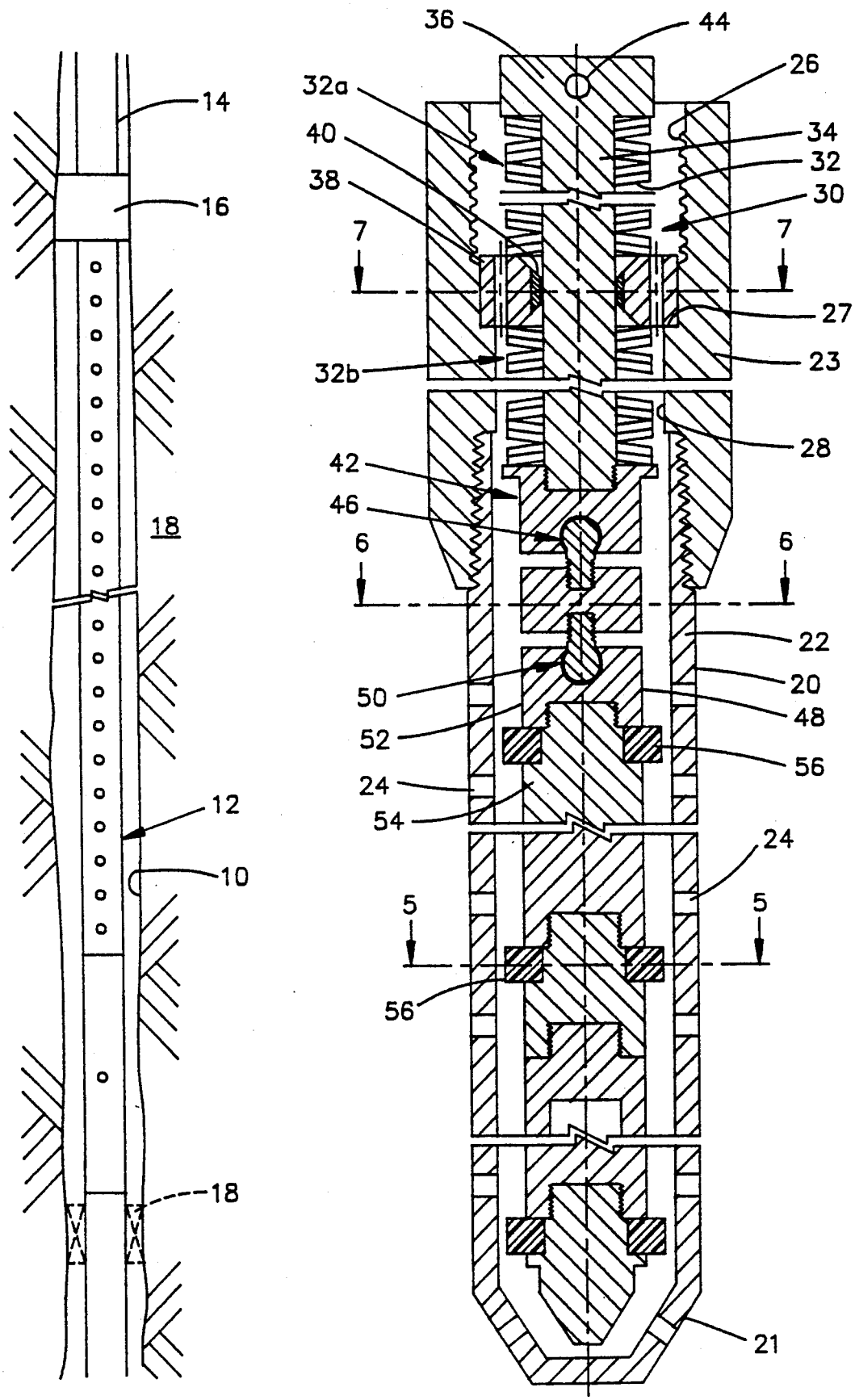
FIG. 1 is an illustration of a drill stem testing operation in which the present operation in which the present invention has applicability.
FIG. 2 is a view in longitudinal cross-section through a gauge carrier and gauge system to illustrate the shock mounting system.

Referring now to FIG. 1, in a typically downhole drill stem operation at great depth, the bore hole 10 has an I.D. which is slightly larger than the O.D. of the perforating means 12 to be inserted through it. In deep wells where the string of drill pipe 14 extends from the surface down to the total depth, the weight of pipe and its strength characteristics become significant and result in smaller diameter perforating devices for testing. Drill stem testing (D.S.T.), in one aspect, involves the lowering of a production packer 16 on a drill string 14 to a location above the formation 18 to be tested. Below the packer 16 are perforating means 12 which can aggregate in length to over a hundred feet or more with perforator densities of 4 to 6 shots, or more per foot where the shots are circumferentially disposed about the perforating device to achieve a circumferential distribution of perforations in the bore hole well. The purpose of a drill stem test is to conduct actual flow of hydrocarbons prior to completion and to ascertain the down hole temperature and pressure conditions of the fluid flow to permit a reservoir and formation analysis. It is desirable to have the pressure and temperature conditions measured as close to the perforator means as possible and to measure the pressure with a great deal of accuracy. This presents certain problems because as the accuracy of pressure measurements increases, the fragility of the pressure transducer increases. In the typical quartz type transducers utilized for high accuracy pressure measurement, the sensors can be easily shattered upon detonation of the perforating means. When the perforating means are detonated, substantial longitudinal shock waves are generated as well as substantial radial or lateral shock waves. These shock waves when transmitted to a fragile pressure transducer tend to affect the accuracy and the functioning of the transducer. As discussed above, the presently available systems are inadequate. In the instance where rubber fingers are used for lateral shock absorption, there are peripheral areas between the fingers which can be the focal point of the shock waves and thus cause shock contact of the gauge against the gauge carrier. Also the fact that the gauge is directly coupled to the longitudinal shock waves permit a combination of longitudinal and radial shock waves which can cause shock contact of the gauge in the gauge carrier. In the instance where the gauge is cushioned by elastomer rings from lateral shock and cushioned by upper and lower helical springs for longitudinal shock, the gauges are effectively isolated from one another but the system is not practical in an operation sense. This is because an intricate and complicated assembly must be done on the rig floor each time the gauges are to be removed and the measurements read.

As illustrated in dashed line 18, in some instances, the lower end below the gauge has a blank section of drill pipe which is slidably received in a lower collar 18 which is located in the well bore to provide for some lateral stability to the lower end of the drill pipe.

Referring now to FIG. 2, a tubular carrier gauge housing 20 has a closed lower end 21 and an upper end 22 which is threadedly connected to a threaded box member 23. Perforations or slots 24 can be provided along the length of the carrier gauge housing 20 to permit bypass fluid flow. In the threaded box member 23 is an internal thread 26 which terminates at an upwardly facing shoulder 27 where the shoulder 27 extends to a bore 28 which is similar in diameter to the bore of the gauge housing 20. The internal thread 26 is adapted to receive the lower end of a perforator housing or a drill pipe.

An upper longitudinal shock absorbing means 30 includes a series or an array of belleville springs or disc springs 32 which are located on a rod member 34. An upper set of belleville springs 32a are contained between an actuator head portion 36 on the rod member 34 and an annular disc support 38. The disc support 38 is sized to seat on the flange shoulder 27 in the box housing 23. The rod member 34 extends through a tubular teflon bushing 40 in the disc support 38 and a lower set of belleville springs 32b is contained between the disc support 38 and a lower connector member 42. As will be explained hereafter, the belleville springs 32 are constructed and arranged to provide a desired or selected spring force for the particular operation to be conducted. The shock absorbing means 30 is assembled by placing the belleville springs 32b, the disc support 38 and belleville springs 32a over the rod member 34 and threadedly screwing the rod member 34 into the connector member 42 until the rod member 34 bottoms out in the bottom of the threaded bore in the connector member 42. The connector member 42 can be held by any conventional gripping means and a wrench flats (not shown) can be used to threadedly connect the rod member 34 to the connector member 42 and to compress the belleville springs. The opening 44 can be used to lift the assembly from the carrier. The compression of the belleville springs 32 is thus easily accomplished in the field without undue frustration and the precise shock loading force in the belleville springs 32 is predetermined by the length of the rod member 34 and the arrangement and number of belleville springs. Both sets of belleville springs 32a, 32b are compressed to a predetermined value and permit the rod member 34 to dampen shock forces developed relative to the box member 23.

As shown in FIG. 2 in the drawings, the bases of the belleville springs are preferably in engagement with the respective end surfaces of the coupling member and the disc member and with the head on the shaft to provide for maximum self alignment. The significant advantage of a belleville spring arrangement over a helical type spring is that it is relatively easy to load up, i.e., compress; the spring loads can be predetermined; it is compact and it involves high frictional forces all of which are ideal for shock absorbing characteristics.

The coupling member 42 includes ball socket and ball member 46. The ball element is threadedly attached by a stem to an isolation coupling member 48. The isolation coupling member 48 is cylindrically shaped. At its lower end, a ball socket and ball member 50 connects to a coupling member 52. The ball member 50 is threadedly attached by a stem to the lower end. The ball and socket members 46, 50 are commercially available device mountings and can be obtained from Specialty Machine & Supply in Scott, La. or can be easily made by most machine shops. The isolation member 48 and the double ball arrangement are aligned along the central axis of the gauge carrier housing 20. The ball arrangement provides an isolation of the longitudinal shock absorbing means 30 from the gauges in the gauge housing 20 in that radial shock waves cause the isolation coupling member 48 to be radially shifted and to decouple the longitudinal shock forces relative to the gauges.

In the above described arrangement, a vertical (or longitudinal) shock force which forces the gauges toward the shock means 40 and the ball members pivot is schematically illustrated in FIG. 8. This movement generates a reaction force which has a lateral reaction force component 60 and a vertical reaction force component 62 as illustrated in FIG. 9. The magnitude of the lateral reaction force 60 is dependent upon the angle $\Phi$ which, in turn, is dependent upon the ratio of L and R where L is the distance between the ball members and R is the lateral deflection. Since the diameter dimension is limited by the I.D. of the carrier body. The maximum value of R may be on the order of 0.25 inches so that an L value of five inches limits the maximum lateral force effect to 5% of the vertical force.

The coupling members 42, 52 and ball members 46, 50 constitute shock isolating means for permitting lateral movement of the isolation member 48 independently of the longitudinal shock absorbing means 30.

The coupling member 52 is threadedly attached to an adapter 54 where the adapter couples to a gauge (not shown) and defines an annular groove for receiving an annular resilient shock absorbing member 56. As illustrated schematically, adapters and shock absorbing members 56 are spaced along the length of the gauge or gauges as desired.

In practice, the number and arrangement of the belleville springs and the length of the rod member 34 are predetermined to provide a selected spring force in the longitudinal shock absorbing means 30. The springs and disc support 38 are loaded onto the rod member 34. The rod member 34 is inserted into threaded end of the coupling member and the actuator head 36 is rotated to bottom out the rod member 34 in the threaded bore in the coupling member 42. The gauges are connected up to the coupling members and adapters by threaded connections with annular elastomer rings 56 located at special intervals along the length of the gauge assembly. The gauges are slipped endwise into the tubular carrier body 20 until the disc support 38 rests on the flange shoulder 27. The box member 23 then attaches to the lower end of a perforator or connector pipe. With the present invention, the pressure gauge can be located near to the perforator device. As can be appreciated, the spring force and support mechanism are inserted and removed as a unit so that the gauge can be removed from the housing to be read out and reinstalled without affecting the spring force on the gauge. Thus, the unit has reliable repeatability.

Figure 3:
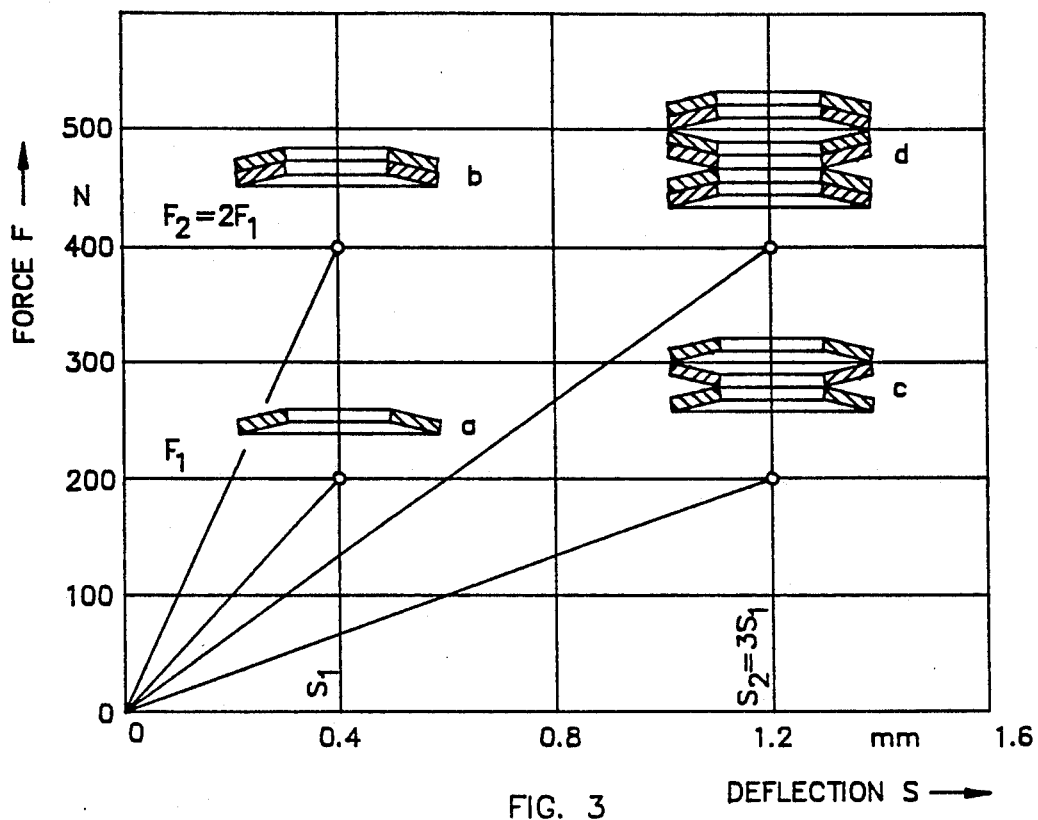
FIG. 3 is a graph of belleville spring discs to obtain linear spring forces.
Figure 4:
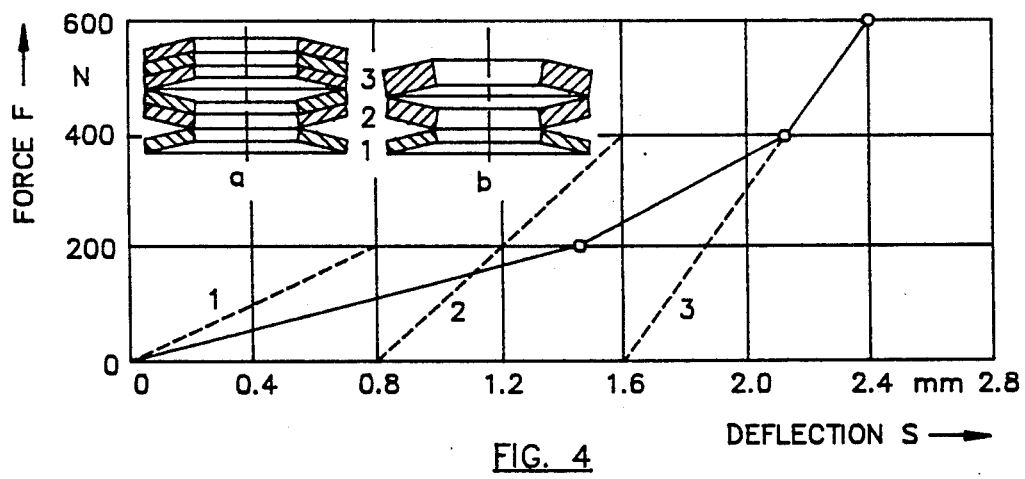
FIG. 4 is a graph of an illustration of a belleville spring to obtain a nonlinear spring characteristic.
Figures 5, 6, 7:
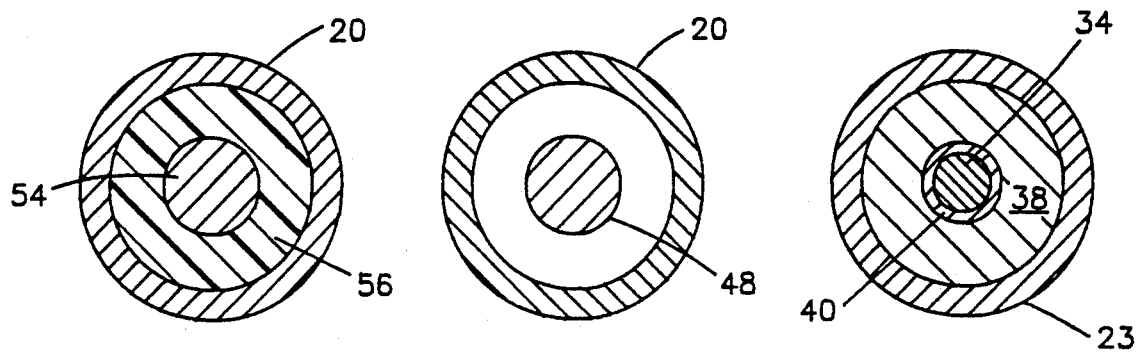
FIG. 5 is a view and cross-section taken along 5—5 of FIG. 1.
FIG. 6 is a view taken along line 6—6 of FIG. 1.
FIG. 7 is a view taken along line 7—7 of FIG. 1.
Figure 10:
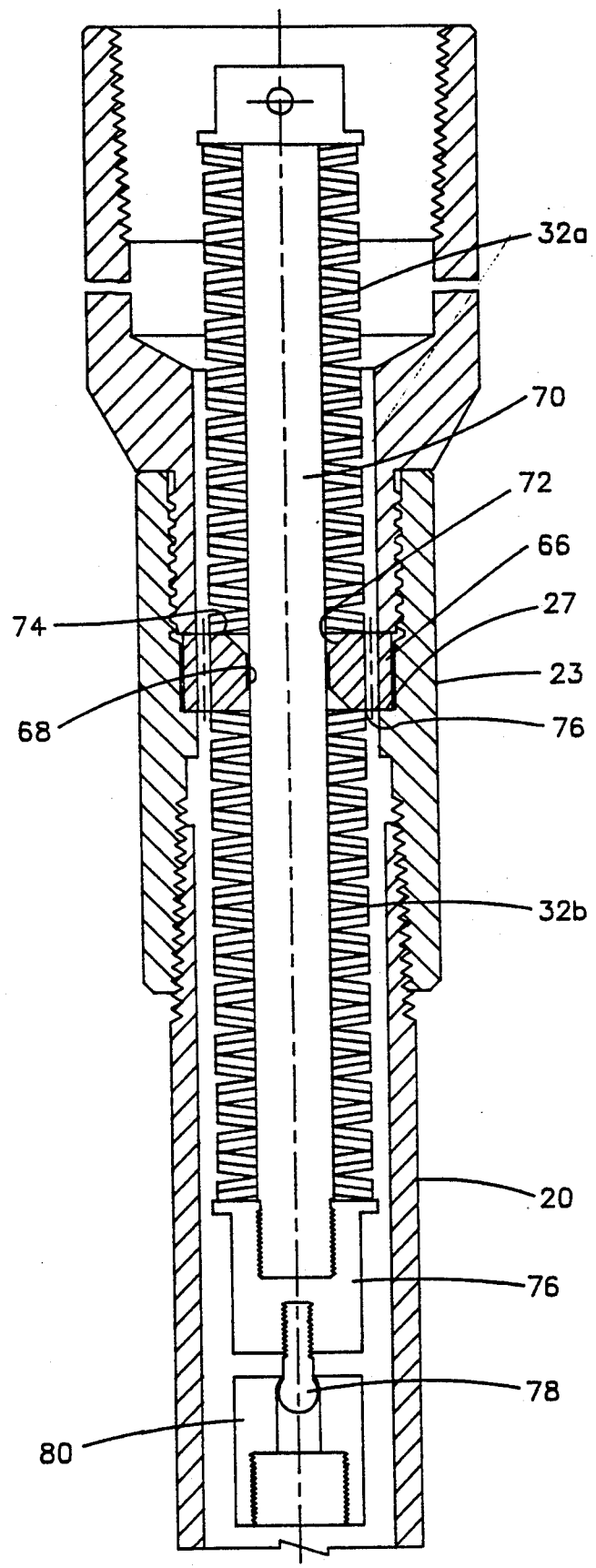
FIG. 10 is a view in longitudinal cross-section of another form of the invention.

Referring now to FIGS. 3 and 4, these illustrations are taken from the Schnoor Handbook for Disc Springs, published 1983 by Adolph Schnoor, TMBH & Company, K.G., West Germany. Disc springs are available from the Schnoor Corporation in Woodside, N.Y. The handbook provides a complete description of disc springs. As illustrated in FIG. 3, a single disc spring has limited force retention value which can be doubled by the use of two springs. Also, the disc springs can be combined in various manners to increase the force and stay within the permissible stress of the spring members. As shown in FIG. 4, the belleville springs can be stacked and arranged to provide a nonlinear spring force which is desirable in many instances for shock absorption. As will be apparent, the belleville springs can be constructed and arranged to provide a preselected force which is either linear or non-linear. As the handbook described, the number of springs and configuration can be related to the compression force desired. Hence, the present invention provides a simple and reliable way of selecting the spring force required for any given application.

In some instances it may be desirable to reduce the length of the assembly and reduce the contact effect of the rod member in the disc support. Referring to FIG. 11, a disc support 66 has an opening 68 configured to permit pivotal or tilting movement of a rod member 70 relative to the disc support 66.

The opening 62 in its simplest form has tapered or rounded surfaces 72 from the end surfaces 74, 76 to the mid section of the disc support 66. A coupling member 76 at the lower end of the rod member 70 is coupled by a single ball member 80 for the gauges.

As shown in schematic representation in FIG. 11, the length of the device is reduced. The clearance between the rod member 70 and the opening is arranged to permit the rod member 70 to freely assume the maximum deflection angle without binding. The disc springs 32a, 32b also provide their self aligning characteristics and provide a spring force acting against the lateral forces. As can be appreciated, the length L is from the mid section of the bore 68 to the ball 78 and the distance R is the lateral shift of the ball 78 from the center line of the assembly.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. An oil field pressure gauge carrier for use with a string of pipe having a central bore in a well bore which traverses earth formations and contains a liquid;

an elongated tubular gauge carrier body member adapted for coupling in close proximity to a perforating apparatus in a string of pipe and for carrying a pressure gauge; where the perforating apparatus develops reaction forces upon detonation, at least one pressure gauge disposed in said body member and having a pressure sensing transducer, said transducer being capable of sensing pressure and having fragility with respect to longitudinal and lateral shock forces produced by reaction forces;

annular resilient shock absorbing means disposed between said gauge and the interior bore of said gauge carrier body member at spaced intervals along the length of said gauge for absorbing lateral shock forces;

longitudinal shock absorbing means including a disc support member adapted for coupling to said gauge carrier body member where said support member has a central opening, a longitudinally extending rod member disposed through said central opening and having an enlarged actuator head portion at one end and a threaded portion at the other end where said threaded portion is receivable in a threaded bore of a coupling member, belleville spring means disposed between said disc support member and said head portion and between said disc support member and the first coupling member where said belleville spring means are constructed and arranged to be compressed when the rod member is threaded into the first coupling member to provide shock absorbing springs, and pivot means for defining longitudinal spaced apart pivots with respect to interconnection of said rod member and said gauge and for pivotally coupling said gauge relative to said rod member to reduce lateral shock forces on said gauge.

2. The apparatus as set forth in claim 1 where said belleville springs have base portions in contact with said disc support member, said head portion and said coupling member for self-alignment.

3. The apparatus as set forth in claim 2 wherein the belleville spring means are stacked in pairs.

4. The apparatus as set forth in claim 1 wherein said pivot means has two ball and socket members at said pivots which couple an isolation block member respectively to said gauge and said rod member for decoupling said longitudinal shock absorbing means from said gauge.

5. The apparatus as set forth in claim 1 wherein the belleville spring means and the rod members are functionally related so that when the rod member bottoms out in the threaded bore, the belleville springs are loaded to a predetermined spring force.

6. The apparatus as set forth in claim 1 wherein said pivot means include a configuration of said central opening relative to said rod member to permit pivoting of said rod member relative said central opening.

7. The apparatus as set fourth in claim 1 wherein said pivot means further includes a ball and socket connection between said rod member and said gauge.

8. The apparatus as set fourth in claim 7 where said belleville springs have base portions in contact with said disc support member, said head portion and said coupling member for self-alignment.

9. The apparatus as set fourth in claim 8 wherein the belleville spring means are stacked in pairs.

10. The apparatus as set fourth in claim 9 wherein the belleville spring means and the rod members are functionally related so that when the rod member bottoms out in the threaded bore, the belleville springs are loaded to a predetermined spring force.

11. An oil field pressure gauge carrier for use with a string of pipe having a central bore in a well bore which traverses earth formations and contains a liquid;

an elongated tubular gauge carrier body member adapted for coupling in close proximity to a perforating apparatus in a string of pipe and for carrying a pressure gauge assembly, said gauge carrier body member having an upwardly facing support shoulder;

a pressure gauge assembly for said body member including a disc support member engagable with said support shoulder for supporting the gauge assembly in said carrier body, said support member having a central bore;

a longitudinally extending rod member disposed through said central bore and having an enlarged actuator head portion at one end and a threaded portion at the other end where said threaded portion is receivable in a threaded bore of a first coupling member;

longitudinal shock absorber means defined by belleville spring means disposed between said disc support member and said head portion and between said disc support member and the first coupling member where said belleville spring means are constructed and are compressed when the rod member is threaded into the coupling member for providing loading for shock absorbing forces;

at least one pressure gauge having a pressure sensing transducer, said transducer having fragility with respect to longitudinal and lateral shock forces produced by reaction forces upon detonation of the perforating apparatus; and annular resilient shock absorbing means disposed about said gauge at spaced intervals along the length of said gauge for absorbing lateral shock forces and sized whereby said assembly can be inserted and removed from said body member as a unit without affecting the loading of longitudinal shock absorber means, pivot means for defining longitudinal spaced apart pivots with respect to the interconnection of said gauge and for pivotally coupling said gauge relative to said rod member to reduce lateral shock forces on said gauge.

12. The apparatus as set forth in claim 11 where said belleville springs have base portions in contact with said disc support member, said head portion and said coupling member for self-alignment.

13. The apparatus as set forth in claim 12 wherein the belleville spring means are stacked in pairs.

14. The apparatus as set forth in claim 11 wherein said pivot means has two ball and socket members which at said pivots which couple an isolation block member respectively to said gauge and said rod member for decoupling said longitudinal shock absorbing means from said gauge.

15. The apparatus as set forth in claim 13 wherein the belleville spring means and the rod members are functionally related so that when the rod member bottoms out in the threaded bore, the belleville springs are loaded to a predetermined spring force.

16. The apparatus as set forth in claim 11 wherein said pivot means includes a configuration of said central opening relative to said rod member to permit pivoting of said rod member relative said central opening.

17. The apparatus as set forth in claim 16 wherein said pivot means further includes a ball and socket connection between said rod member and said gauge.

* * * * *